(12) United States Patent
Laue et al.

(10) Patent No.: US 6,439,599 B1
(45) Date of Patent: Aug. 27, 2002

(54) STEERING WITH AIRBAG MODULE

(75) Inventors: Andreas Laue, Elsenfeld; Joachim Blattner, Waldaschaff; Wilhelm Schnabel, Niedernberg, all of (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 09/787,485

(22) PCT Filed: Sep. 14, 1999

(86) PCT No.: PCT/DE99/02973

§ 371 (c)(1),
(2), (4) Date: Mar. 16, 2001

(87) PCT Pub. No.: WO00/15470

PCT Pub. Date: Mar. 23, 2000

(30) Foreign Application Priority Data

Sep. 16, 1998 (DE) ..................... 298 16 923 U

(51) Int. Cl.[7] .............................. B60R 21/16
(52) U.S. Cl. .................. 280/731; 280/728.2; 280/743.1
(58) Field of Search .............. 280/731, 728.2, 280/743.1

(56) References Cited

U.S. PATENT DOCUMENTS

| | | | | | |
|---|---|---|---|---|---|
| 3,843,152 A | * | 10/1974 | Nonaka | .................... | 280/728.2 |
| 5,024,464 A | | 6/1991 | Kawaguchi et al. | ........ | 280/731 |
| 5,125,683 A | * | 6/1992 | Nakajima | .................... | 280/731 |
| 5,388,858 A | * | 2/1995 | Cuevas | .................... | 280/731 X |
| 5,505,483 A | * | 4/1996 | Taguchi et al. | ............. | 280/731 |
| 5,597,177 A | * | 1/1997 | Matsuura | ..................... | 280/731 |
| 5,613,700 A | * | 3/1997 | Hiramitsu et al. | .......... | 280/731 |
| 5,647,610 A | * | 7/1997 | Nagata | ........................ | 280/731 |
| 5,765,865 A | * | 6/1998 | Nagata et al. | .............. | 280/731 |
| 5,813,692 A | * | 9/1998 | Faigle et al. | ................. | 280/731 |
| 6,164,689 A | * | 12/2000 | Rivin et al. | .................. | 280/731 |
| 6,176,511 B1 | * | 1/2001 | Adkisson et al. | ........... | 280/731 |

FOREIGN PATENT DOCUMENTS

| | | |
|---|---|---|
| DE | 37 10 173 | 10/1988 |
| DE | 39 25 761 | 2/1990 |
| DE | 44 39 576 | 5/1996 |
| DE | 299 02 033 | 5/1999 |
| GB | 2 292 353 | 2/1996 |

\* cited by examiner

*Primary Examiner*—Lanna Mai
*Assistant Examiner*—Toan To
(74) *Attorney, Agent, or Firm*—Foley & Lardner

(57) ABSTRACT

The invention relates to a steering wheel having an air-bag module which has a gas generator and an air bag and is covered with respect to the passenger compartment by means of a covering cap provided on the upper side of the steering wheel, the gas generator being provided as an oscillation damper by being mounted in the air-bag module in at least one element which is elastically deformable when the steering wheel oscillates. According to the invention, the gas generator (6) is peripherally mounted in the elastically deformable element (3, 34) and/or the elastically deformable element (19) has a peripheral sealing lip (26) which, after the gas generator is ignited, bears against the latter or against a component connected to the latter.

17 Claims, 5 Drawing Sheets

STEERING WITH AIRBAG MODULE

CROSS-REFERENCE TO RELATED APPLICATION

This application claims priority of International application number PCT/DE99/02973, filed Sep. 14, 1999, which in turn claims priority to German patent application number 298 16 923.1, filed Sep. 16, 1998.

BACKGROUND OF THE INVENTION

The invention relates to a steering wheel having an air-bag module in accordance with the preamble of claim 1.

In the case of motor-vehicle steering wheels, because of the rigid coupling to the steering column there is the problem of a steering wheel vibrating at least in certain speed ranges. These vibrations are caused as a function of a certain rotational speed of the engine by the characteristic frequency of the air-bag steering wheel. In order to reduce these vibrations, in addition to shifting the characteristic frequency of the air-bag steering wheel, by attaching an additional mass to the steering wheel, into a frequency range lying outside the range of the oscillations actually occurring on the steering wheel, it is disclosed, for example, in DE 37 10 173 A1 to mount the housing of the air-bag unit on the steering wheel in a damped manner in terms of oscillations in such a manner that the said housing can be moved relative to the steering wheel and transverse to the longitudinal axis of the steering column. Provision is additionally made for the housing also to be movable in the direction of the longitudinal axis of the steering column. Its ability to move is achieved by holding clips having bearing bushings, which have noise-damping properties, in corresponding holes being arranged at the sides of the housing. Holding screws for fastening the holding clips to the spokes of the steering wheel are guided through the bearing bushings. In this arrangement, there is a clearance between the shank of each holding screw and the respective bushing, the said clearance enabling the holding clips to be shifted laterally with respect to the holding screws. A floating mounting arrangement is therefore obtained. In this case, the entire air-bag module, including the cap, which screens the module off from the passenger compartment, is mounted in a floating manner.

The disadvantage of this arrangement resides in the fact that when vibrations occur at the steering wheel, these vibrations can be seen, inter alia, because of the relative movement of the cap with respect to the steering wheel. This is because while the steering wheel oscillates as a consequence of the rigid coupling to the steering spindle, greatly reduced vibrations, if any at all, occur at the cap. There must therefore be a relatively large gap between the cap and the steering wheel in order to avoid the mutual friction and therefore annoying noises when vibrations occur.

Furthermore, DE 39 25 761 A1 discloses a vibration-suppressing device for a steering wheel having an air-bag module. In this device, a housing for holding the air bag is attached rigidly to the steering-wheel body and the gas generator is attached to the housing by a plurality of elastic means. Elastic bushings which are held by means of rivets are provided as the elastic means.

The disadvantage of this arrangement is that after the gas generator is ignited, gas can not only flow into the air bag, but can also flow in the opposite direction out of the steering wheel, with the result that the pressure in the air bag is reduced as is therefore the pressure for opening the covering cap.

SUMMARY OF THE INVENTION

The invention is based on the object of damping oscillations at the steering wheel to the greatest possible extent and of obtaining an improved cap-opening pressure.

In the case of a steering wheel having an air-bag module which has a gas generator and an air bag and is covered with respect to the passenger compartment by means of a covering cap provided on the upper side of the steering wheel, the gas generator being provided as an oscillation damper by being mounted in the air-bag module in at least one element which is elastically deformable when the steering wheel oscillates, the gas generator is peripherally mounted in the elastically deformable element and/or the elastically deformable element has a peripheral sealing lip which, after the gas generator is ignited, bears against the latter or against a component connected to the latter.

This results in the advantage that, in spite of a covering cap which moves separately from the steering wheel on the upper side of the steering wheel, because of the oscillation damping a relative movement between the covering cap and the steering wheel is at least reduced. Even in the case of a steering wheel with an integrated air bag where the covering cap is part of the steering wheel, the oscillation damping on the steering wheel is effective in the same manner. At the same time, a sealing function is obtained because of the peripheral mounting arrangement of the gas generator. In the design with a sealing lip, the latter, in the inoperative state, does not bear [lacuna] gas generator or against a component connected to the latter so as not to affect the function of the gas generator as an oscillation damper. Only after the gas generator is ignited is the sealing lip placed into position giving rise to an increased pressure for opening the covering cap, since gas is prevented from flowing off counter to the unfolding direction of the air bag.

The elastically deformable element is expediently connected to the air-bag module by means of at least one additional component.

The additional component can consist, for example, of plastic or sheet metal.

In one embodiment, the elastically deformable element is fixed within the air-bag module by sheet-metal parts of the air-bag module. In a further refinement, provision is made for the air bag, a diffuser and the covering cap to be fastened to at least one of the sheet-metal parts. The diffuser also prevents, inter alia, contact between the air bag and the gas generator, so that oscillations of the said gas generator cannot be transmitted to the air bag.

In one embodiment, at least one first sheet-metal part is connected to the steering wheel and this sheet-metal part has a depression in which a side edge of the covering cap engages. Furthermore, at least one second sheet-metal part is connected to the first sheet-metal part via this side edge.

The fastening of the gas generator expediently takes place in such a manner that a flange of the gas generator engages in the elastically deformable element.

In a further embodiment, provision is made for the air bag to be fastened together with a diffuser to the air-bag module.

In one embodiment, the elastically deformable element has a downwardly pointing peg. The latter facilitates the positioning of the gas generator and assists in the function of the gas generator as an oscillation damper. In order to obtain simple installation of the pegs, the latter are expediently provided with an introducing bevel.

A groove is preferably provided on the elastically deformable element for receiving the flange of the gas generator, the groove bottom being curved outwards and the groove side surfaces diverging therefrom.

An oscillating element made of rubber is preferably provided as the elastically deformable element.

The arrangement according to the invention can be used both in a steering wheel with an integrated air bag where the covering cap is part of the steering wheel, and in a design where a covering cap which moves separately from the steering wheel is provided.

Furthermore, in one design, in addition to the elastic mounting arrangement of the gas generator the air-bag module as a whole is additionally spring-mounted, with the result that a floating horn device can be provided, whereby the horn contacts can therefore be closed by pressing down the covering cap or one of the regions thereof.

A cup-shaped gas generator is preferably provided as the gas generator.

BRIEF DESCRIPTION OF THE DRAWINGS

The invention will be explained in the exemplary embodiments with reference to drawings, in which.

DETAILED DESCRIPTION

Figure 1:
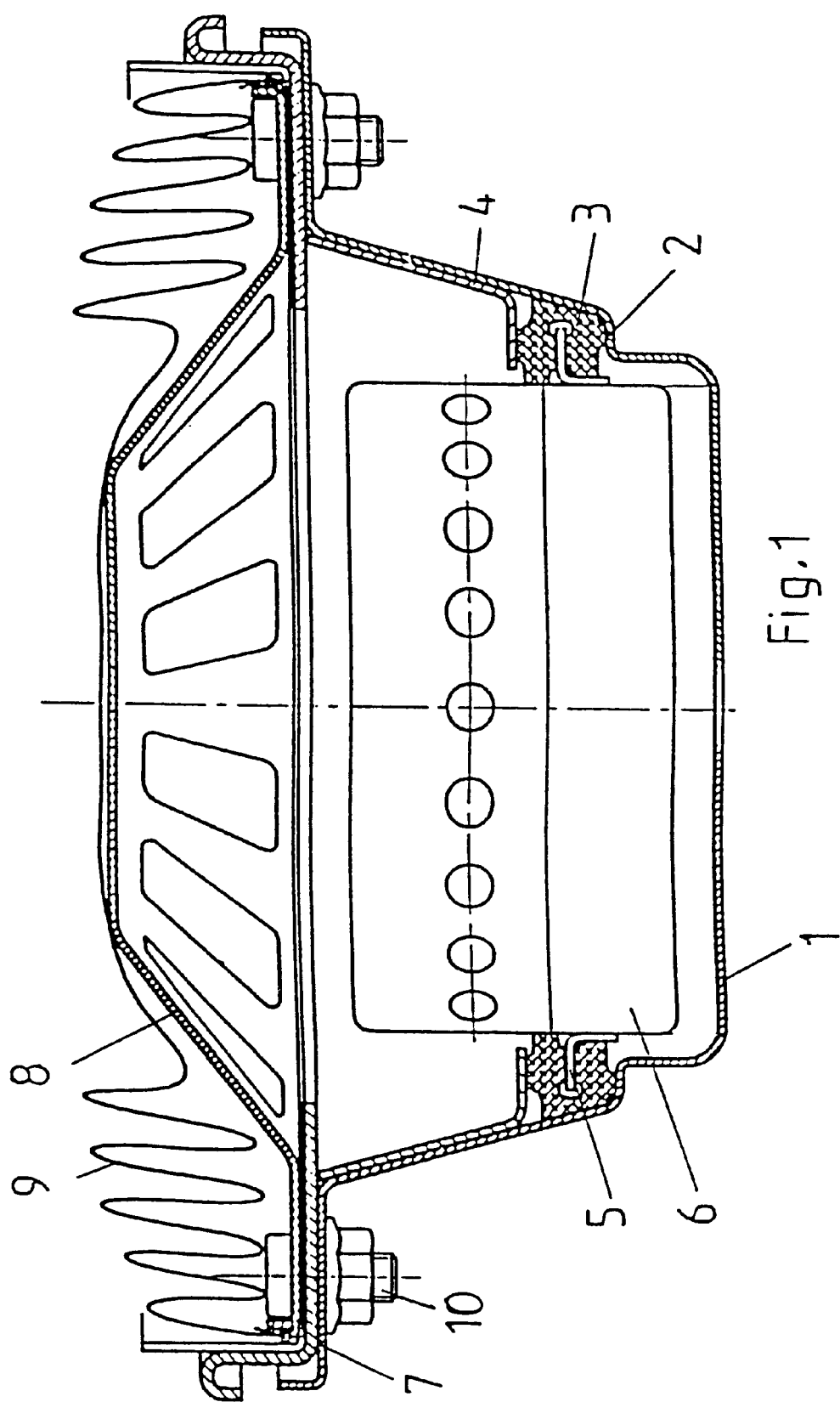
FIG. 1 shows a cross section through a first embodiment of an air-bag module.

The air-bag module which is illustrated in FIG. 1 has a housing 1 which is upwardly enlarged in a step-shaped manner and is connected fixedly to the steering wheel in a manner known per se (not illustrated). Resting on a lower, horizontal section 2 of the housing 1, as an oscillating element, is a rubber ring 3 whose upper side is assigned a peripheral holding element 4 made of sheet metal. This holding element presses the rubber ring 3 against the horizontal section 2 and therefore fixes it in place.

The rubber ring 3 has a slot in which a flange 5 of a gas generator 6 engages, the gas generator thereby being mounted in an oscillating manner. If the housing 1 oscillates together with the steering wheel, because of the oscillating mounting arrangement the gas generator acts as an oscillation damper. This reduces the oscillation amplitude of the steering wheel.

A diffuser 8 and an air bag 9 are fastened on the upper, horizontal section 7 of the housing 1 by means of screws 10. A covering cap (not illustrated) is also connected to the housing 1, with the result that there is no relative movement between the diffuser 8, the air bag 9 and the covering cap. Since the housing 1 is connected fixedly to the steering wheel, there is also no relative movement between the covering cap and the steering wheel.

Figure 2:
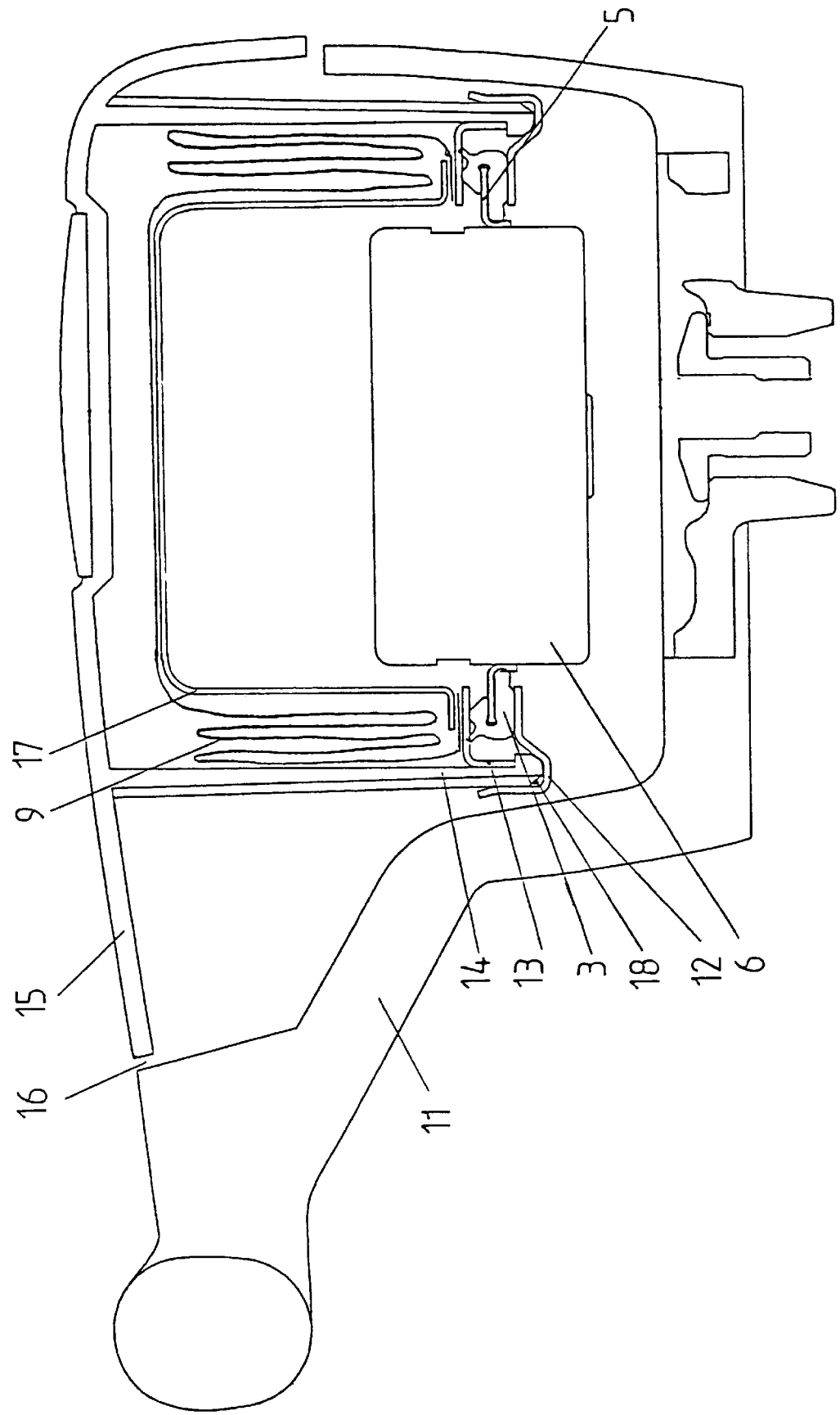
FIG. 2 shows a cross section through a steering wheel having a second embodiment of the air-bag module.

FIG. 2 illustrates a steering wheel 11 in which the elastic rubber ring 3 is fixed between annular sheet-metal parts 12, 13. The sheet-metal part 12 is connected fixedly to the steering wheel 11 (not illustrated) directly or via further components. Fixed between the sheet-metal parts 12, 13 is is [sic] a side edge 14 of a covering cap 15, the said side edge engaging in a depression 18. The lower region of the covering cap 15 is therefore connected fixedly to the steering wheel 11. In contrast, the upper side of the steering wheel does not have any connection to the steering wheel, but a gap 16 is provided between the steering wheel 11 and the covering cap 15. Because of the fixed connection of the covering cap 15 to the steering wheel 11 by means of the side edge 14 it is not possible for any relative movement to take place between the said steering wheel and the covering cap 15, with the result that the gap 16 can be small. A diffuser 17 is fastened together with the air bag 9 to the sheet-metal part 13. Since the sheet-metal part 13 is connected fixedly to the sheet-metal part 12 via the side edge 14, the diffuser 17 and the air bag 9 are therefore also connected fixedly to the steering wheel. It is therefore not possible for any relative movement to take place between the air bag 9 and the covering cap 15, with the result that there does not have to be a clear separation of these two components.

Figure 3:
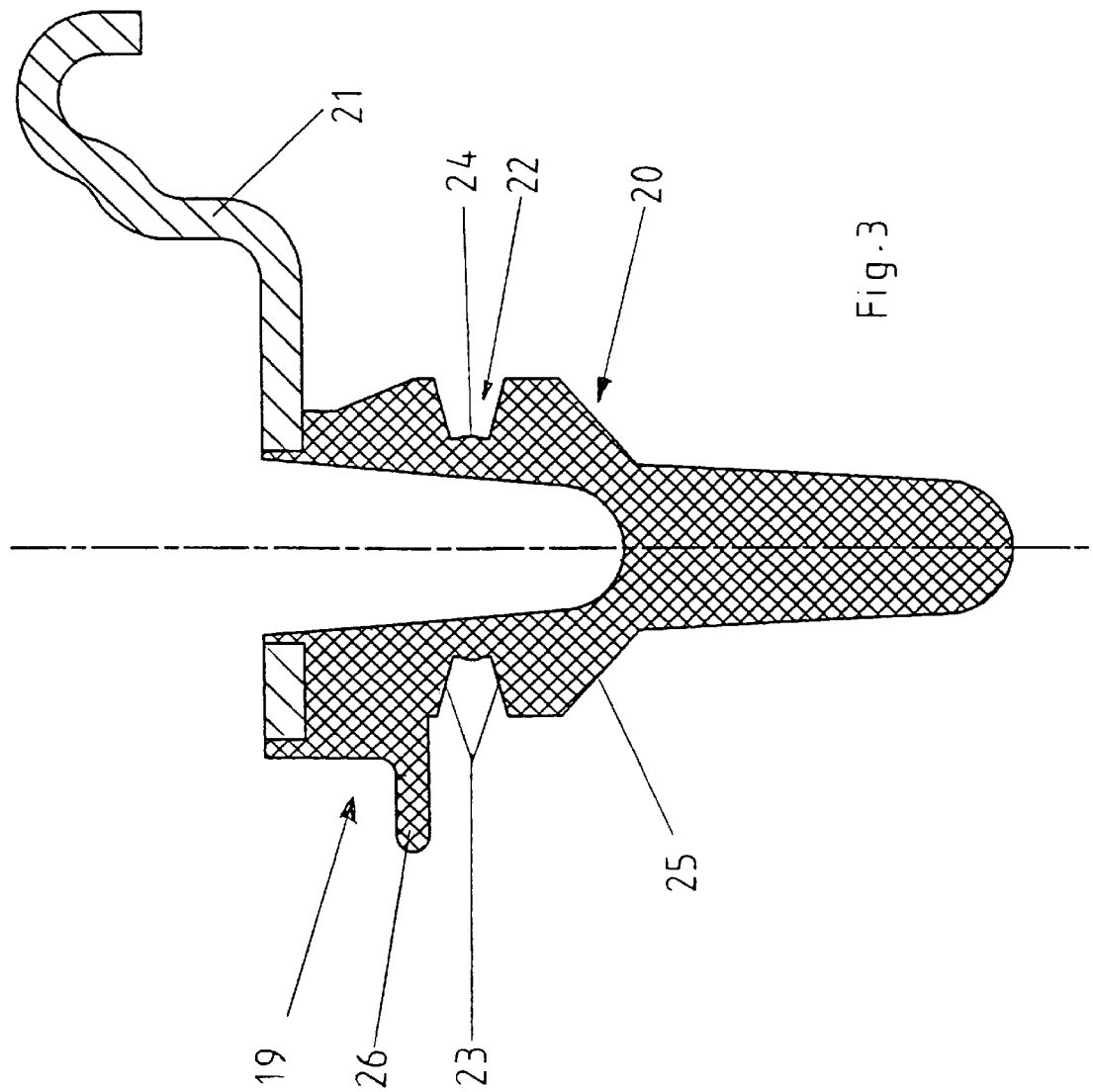
FIG. 3 shows a section through an embodiment of an elastic element.
Figure 4:
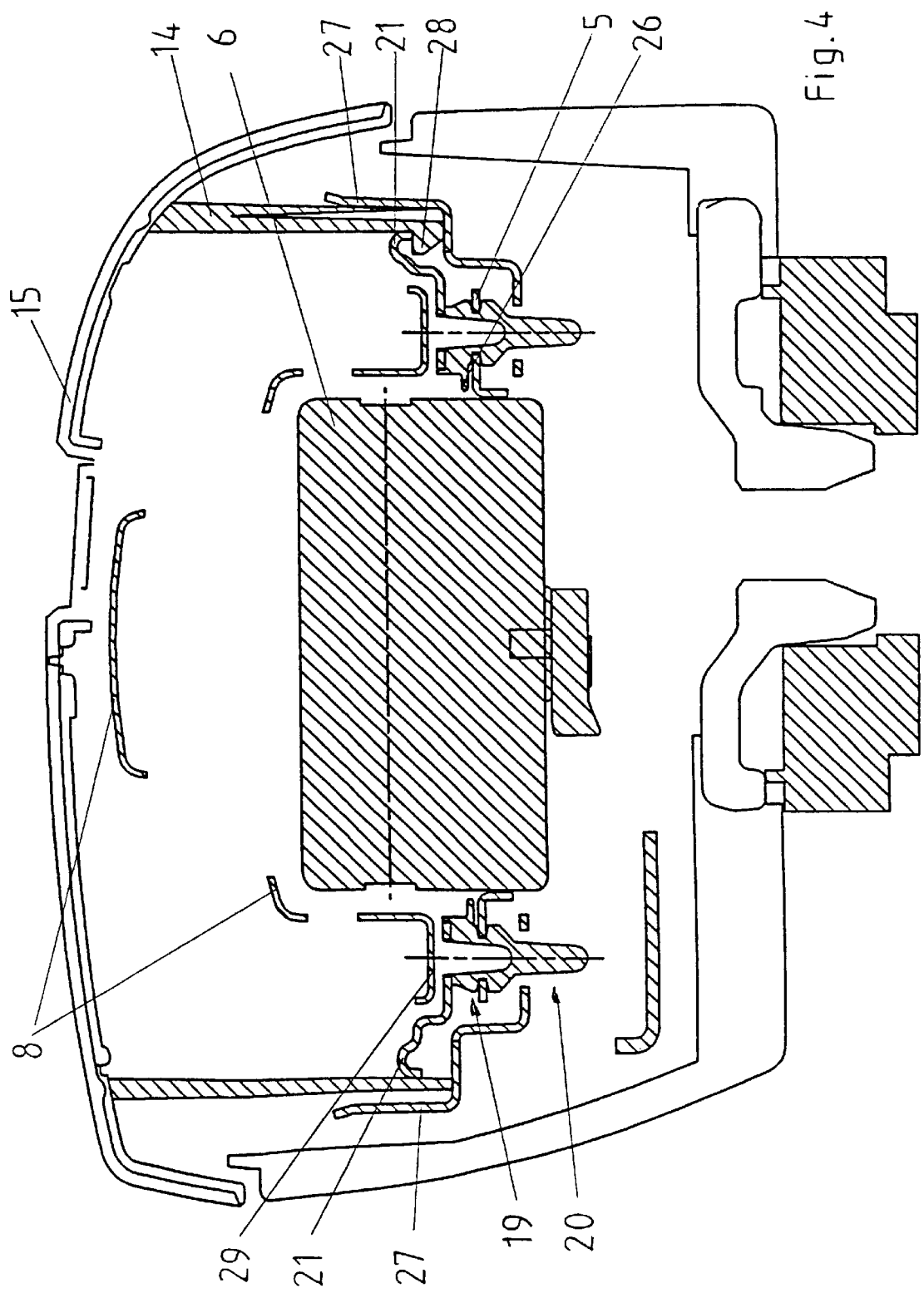
FIG. 4 shows a cross section through an air-bag module having elastic elements according to FIG. 3.

FIG. 3 illustrates a peripheral, elastically deformable element 19 which has pegs 20 at predetermined angular spacings. The elastically deformable element 19 preferably consists of rubber and is fastened to an annular component 21, for example made of sheet metal, which is connected fixedly to the air-bag module (not illustrated). Each peg 20 is provided with a peripheral groove 22 for receiving the flange 5 of the gas generator 6 (FIG. 4). In order to avoid function-impairing friction between the flange 5 and the peg 20, the lateral groove surfaces 23 diverge from the groove bottom 24. The groove bottom 24 is designed such that it curves outwards so as to protect the peg from the sheet-metal edges of the flange 5. For simple installation, an introducing bevel 25 is provided on the peg.

The elastic element 19 has a peripheral sealing lip 26 which lies above the flange 5. As can be seen from FIG. 4, in the inoperative state the sealing lip does not, however, bear against the flange 5, with the result that the function of the gas generator 6 as an oscillation damper is not affected. However, after the gas generator 6 is ignited the sealing lip is positioned against the flange 5, so that the space which is filled by the gas of the gas generator, i.e. the space next to and above the gas generator, is sealed off from the surroundings. This sealing ensures the necessary pressure for opening the covering cap 15.

The sheet-metal part 21 is connected fixedly to a sheet-metal part 27 of the air-bag module directly or with the interposition of further parts (not illustrated). The covering cap 15 is connected fixedly via its side wall 14 to the air-bag module by a lower, hook-shaped end 28 gripping below the sheet-metal part 21 and by the side wall 14 bearing laterally against the sheet-metal part 27.

The air bag (not illustrated in FIG. 4) is fastened between the sheet-metal part 21 and a peripheral air-bag holding part 29 and when folded primarily extends next to the diffuser 8, as is illustrated in FIG. 1.

Figure 5:
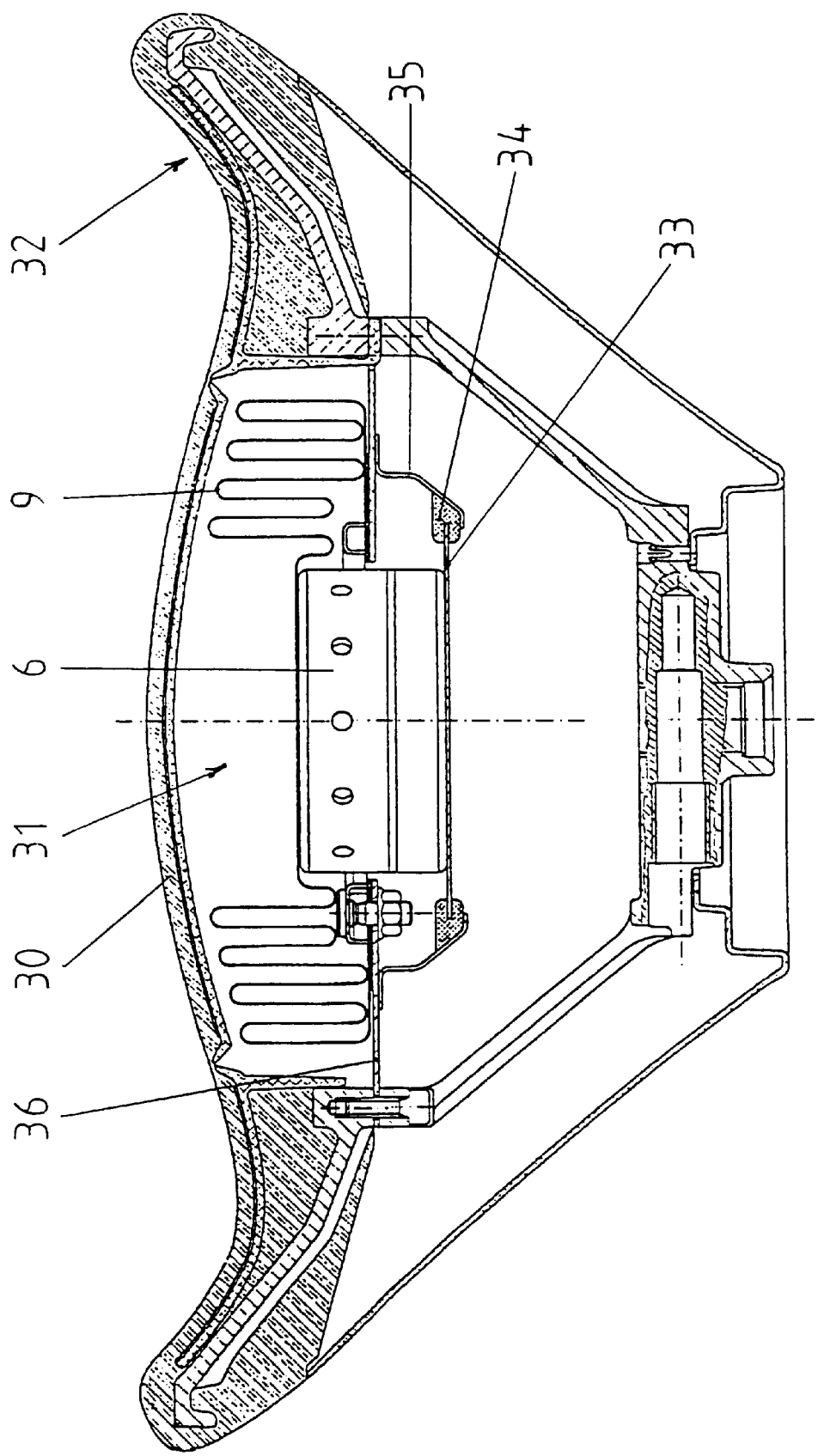
FIG. 5 shows a cross section through a steering wheel having a covering integrated in the steering wheel.

In the embodiment of FIG. 5, a covering cap 30 of an air-bag module 31 is an integrated part of a steering wheel 32. In this embodiment, the gas generator 6 is connected to a carrier part 33 which is guided in an annular, elastic element 34, for example made of rubber. The elastic element 34 is connected fixedly to a base 36 of the air-bag module 31 via an annular intermediate part 35, which can be manufactured, for example, from sheet metal. The peripheral, elastic element 34 and the carrier part 33 ensure that after the gas generator 6 is ignited it is not possible for any gas to escape counter to the unfolding direction of the air bag 9. This arrangement furthermore also ensures the function of the gas generator as an oscillation damper, since the said gas generator is only guided in the elastic element 34 and there is no connection to the base 36.

What is claimed is:

1. Steering wheel having an air-bag module, wherein said air-bag module has a gas generator and an air bag, and wherein said air bag module is covered with respect to the passenger compartment by a covering cap provided on the upper side of the steering wheel, wherein the gas generator dampens oscillations by being mounted in the air-bag module in at least one element which is elastically deformable when the steering wheel oscillates, wherein the gas generator is peripherally mounted in the elastically deformable element, and wherein the elastically deformable element has a peripheral sealing lip which, after the gas generator is ignited, bears against the gas generator or against a component connected to the gas generator.

2. Steering wheel according to claim 1, wherein the elastically deformable element is connected to the air-bag module by at least one additional component.

3. Steering wheel according to claim 1, wherein the additional component comprises plastic.

4. Steering wheel according to claim 1, wherein the elastically deformable element is fixed within the air-bag module by sheet-metal parts of the air-bag module.

5. Steering wheel according to claim 4, wherein the air bag, a diffuser and the covering cap are fastened to at least one of the sheet-metal parts.

6. Steering wheel according to claim 4, wherein a first one of the sheet-metal parts is connected to the steering wheel and has a depression in which a side edge of the covering cap engages, and wherein a second one of the sheet metal parts is connected to the first sheet-metal part via the side edge.

7. Steering wheel according to claim 1, wherein the gas generator has a flange which engages in the elastically deformable element.

8. Steering wheel according to claim 1, wherein the air bag is fastened together with a diffuser to a housing of the air-bag module.

9. Steering wheel according to claim 7, wherein the elastically deformable element has a peripheral sealing lip extending in the region of the flange substantially parallel thereto.

10. Steering wheel according to claim 1, wherein the elastically deformable element includes at least one downwardly pointing peg.

11. Steering wheel according to claim 10, wherein the peg includes a beveled surface.

12. Steering wheel according to claim 10, wherein the elastically deformable element has, in the region of the peg, a groove for receiving the flange, wherein the groove bottom is curved outwards and the groove side surfaces diverge from the groove bottom.

13. Steering wheel according to claim 1, wherein the elastically deformable element comprises a rubber oscillating element.

14. Steering wheel according to claim 1, wherein the covering cap is part of the steering wheel.

15. Steering wheel according to claim 1, wherein the covering cap is configured to move separately from the steering wheel.

16. Steering wheel according to claim 1, wherein the air-bag module is spring mounted.

17. Steering wheel according to claim 1, wherein the gas generator is cup-shaped.

* * * * *